(12) United States Patent
Wang et al.

(10) Patent No.: US 12,301,337 B2
(45) Date of Patent: May 13, 2025

(54) RANDOM DMRS SEQUENCE GENERATION IN NR UPLINK

(71) Applicant: Apple Inc., Cupertino, CA (US)

(72) Inventors: Guotong Wang, Beijing (CN); Alexei Davydov, Nizhny Novgorod (RU); Avik Sengupta, San Jose, CA (US); Sameer Pawar, Santa Clara, CA (US); Gregory V. Morozov, Nizhny Novgorod (RU); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 17/287,081

(22) PCT Filed: Oct. 31, 2019

(86) PCT No.: PCT/US2019/059147
§ 371 (c)(1),
(2) Date: Apr. 20, 2021

(87) PCT Pub. No.: WO2020/092760
PCT Pub. Date: May 7, 2020

(65) Prior Publication Data
US 2021/0377997 A1      Dec. 2, 2021

Related U.S. Application Data

(60) Provisional application No. 62/754,982, filed on Nov. 2, 2018.

(51) Int. Cl.
*H04J 13/00*   (2011.01)
*H04L 5/00*    (2006.01)
(Continued)

(52) U.S. Cl.
CPC ........ *H04J 13/0029* (2013.01); *H04L 5/0051* (2013.01); *H04L 27/2613* (2013.01);
(Continued)

(58) Field of Classification Search
None
See application file for complete search history.

(56) References Cited

U.S. PATENT DOCUMENTS 10,230,508 B2 *   3/2019   Shin ..................... H04W 72/20
11,368,275 B2 *   6/2022   Moon ................... H04L 5/0094
(Continued)

FOREIGN PATENT DOCUMENTS

AU      2012372980 A1 *  10/2014   .......... H04L 5/0053
AU      2013262151 A1 *   3/2015   .......... H04L 5/0053
(Continued)

OTHER PUBLICATIONS

International Preliminary Report on Patentability dated Apr. 27, 2021 in connection with PCT Application No. PCT/US2019/059147.
(Continued)

*Primary Examiner* — Andrew C Oh
(74) *Attorney, Agent, or Firm* — Eschweiler & Potashnik, LLC; Ninjiao Zhang

(57) ABSTRACT

A service device (e.g., a user equipment (UE), a new radio NB (gNB), or other network component or network management component) can process or generate a Downlink Control Information (DCI) that schedules a Physical Uplink Shared Channel (PUSCH) transmission in a PUSCH. The PUSCH transmission can be generated based on a Demodulation Reference Signal (DMRS) according to a Discrete Fourier Transform (DFT) spread Orthogonal Frequency Division Multiplexing (DFT-s-OFDM) waveform in uplink. A sequence of the DMRS can be generated based on a Gold
(Continued)

sequence and a Pi/2 Binary Phase-Shift Keying (BPSK) modulation.

18 Claims, 4 Drawing Sheets

(51) Int. Cl.
   *H04L 27/26* (2006.01)
   *H04W 72/23* (2023.01)
(52) U.S. Cl.
   CPC ........ *H04L 27/262* (2013.01); *H04L 27/2636* (2013.01); *H04W 72/23* (2023.01)

(56) References Cited

U.S. PATENT DOCUMENTS

| | | | | |
|---|---|---|---|---|
| 2011/0249548 A1* | 10/2011 | Gaal | ................... | H04J 13/0059 375/260 |
| 2011/0310838 A1* | 12/2011 | Zheng | ................... | H04L 5/0053 370/329 |
| 2012/0309405 A1* | 12/2012 | Parkvall | ............... | H04W 16/32 455/450 |
| 2014/0286255 A1* | 9/2014 | Nam | ................... | H04L 27/2636 370/329 |
| 2015/0049704 A1 | 2/2015 | Park et al. | | |
| 2016/0105882 A1* | 4/2016 | Park | ...................... | H04B 7/024 370/329 |
| 2016/0119947 A1* | 4/2016 | Park | ...................... | H04L 5/0035 370/329 |
| 2017/0064571 A1 | 3/2017 | Kusashima et al. | | |
| 2017/0286255 A1* | 10/2017 | Kinnear | ............. | G06F 9/45504 |
| 2018/0270799 A1* | 9/2018 | Noh | ...................... | H04L 27/261 |
| 2018/0279327 A1* | 9/2018 | Ying | ..................... | H04W 72/0446 |
| 2018/0324678 A1* | 11/2018 | Chen | .................... | H04W 8/08 |
| 2019/0081840 A1* | 3/2019 | Park | .................... | H04L 27/2636 |
| 2019/0246395 A1* | 8/2019 | Huang | ................... | H04L 5/0003 |
| 2020/0127786 A1* | 4/2020 | Kwak | ................... | H04B 7/0417 |
| 2020/0154376 A1* | 5/2020 | Ko | ........................ | H04W 72/30 |
| 2020/0213051 A1* | 7/2020 | Wu | ....................... | H04L 5/0051 |
| 2020/0235878 A1* | 7/2020 | Yang | .................... | H04W 72/12 |
| 2020/0252172 A1* | 8/2020 | Xi | ...................... | H04L 27/26134 |
| 2020/0344034 A1* | 10/2020 | Moon | ...................... | H04L 5/10 |
| 2020/0389847 A1* | 12/2020 | Deng | ................ | H04W 52/0219 |
| 2021/0266887 A1* | 8/2021 | Zhang | ................... | H04L 5/0053 |

FOREIGN PATENT DOCUMENTS

| | | | | | |
|---|---|---|---|---|---|
| BR | 112013017480 | A2 | * | 10/2020 | ............... H04B 7/02 |
| CN | 105981454 | A | * | 9/2016 | ........... H04J 11/0073 |
| CN | 110495112 | A | * | 11/2019 | ........... H04J 11/0069 |
| CN | 110868279 | A | * | 3/2020 | ............ H04L 5/0048 |
| CN | 110945805 | A | * | 3/2020 | ........... H04J 11/0069 |
| CN | 111133808 | A | * | 5/2020 | ............ H04L 5/0048 |
| CN | 108886448 | B | * | 6/2021 | ........... H04J 13/0003 |
| EP | 2385645 | A2 | * | 11/2011 | ............ H04L 1/0031 |
| EP | 2775642 | A2 | * | 9/2014 | ............. H04B 17/00 |
| EP | 3457792 | A1 | * | 3/2019 | ........... H04J 11/0069 |
| KR | 1020180112862 | A | | 10/2018 | |
| TW | 201203913 | A | * | 1/2012 | ........... H04J 13/0059 |
| WO | WO-2011034392 | A2 | * | 3/2011 | ........ H04L 27/2607 |
| WO | WO-2013044674 | A1 | * | 4/2013 | ........... H04J 13/0074 |
| WO | WO-2013129870 | A1 | * | 9/2013 | ........... H04L 27/2607 |
| WO | WO-2014019194 | A1 | * | 2/2014 | ........ H04L 27/2613 |
| WO | WO-2014063592 | A1 | * | 5/2014 | ........ H04W 52/0212 |
| WO | WO-2014098407 | A1 | * | 6/2014 | ........... H04B 7/0413 |
| WO | WO-2014107095 | A1 | * | 7/2014 | ............. H04W 24/08 |
| WO | WO-2014179955 | A1 | * | 11/2014 | ........ H04B 1/70735 |
| WO | 2016114544 | A1 | | 7/2016 | |
| WO | 2017026814 | A1 | | 2/2017 | |
| WO | WO-2017111983 | A1 | * | 6/2017 | ........... H04B 7/0413 |
| WO | WO-2017119720 | A2 | * | 7/2017 | ............. H04L 27/18 |
| WO | WO-2018175801 | A1 | * | 9/2018 | ........... H04L 5/0048 |
| WO | WO-2018203717 | A1 | * | 11/2018 | ........... H04B 7/0452 |
| WO | WO-2018231014 | A1 | * | 12/2018 | ........... H04J 11/0069 |
| WO | WO-2019022575 | A1 | * | 1/2019 | ........... H04J 11/0069 |
| WO | WO-2019095905 | A1 | * | 5/2019 | ........... H04L 27/206 |
| WO | WO-2019206432 | A1 | * | 10/2019 | ........... H04L 25/0226 |
| WO | WO-2019215822 | A1 | * | 11/2019 | ........ H04L 27/2613 |

OTHER PUBLICATIONS

PCT Search Report dated Feb. 27, 2020 in connection with PCT Application No. PCT/US2019/059147.
PCT Written Opinion dated Feb. 27, 2020 in connection with PCT Application No. PCT/US2019/059147.

* cited by examiner

FIG. 3

```
DMRS-UplinkConfig ::=    SEQUENCE {
    dmrs-Type              ENUMERATED {type2}                              OPTIONAL,  -- Need S
    dmrs-AdditionalPosition ENUMERATED {pos0, pos1, pos3}                  OPTIONAL,  -- Need R
    phaseTrackingRS        SetupRelease { PTRS-UplinkConfig } OPTIONAL,    -- Need M
    maxLength              ENUMERATED {len2}                               OPTIONAL,  -- Need S transformPrecodingDisabled SEQUENCE {
        scramblingID0      INTEGER (0..65535)                              OPTIONAL,  -- Need S
        scramblingID1      INTEGER (0..65535)                              OPTIONAL,  -- Need S
        ...
                                                                           OPTIONAL,  -- Need R
    transformPrecodingEnabled  SEQUENCE {
        scramblingID0      INTEGER (0..65535)                              OPTIONAL,  -- Need S
        scramblingID1      INTEGER (0..65535)                              OPTIONAL,  -- Need S
        nPUSCH-Identity    INTEGER(0..1007)                                OPTIONAL,  -- Need S
        sequenceGroupHopping ENUMERATED {disabled}                         OPTIONAL,  -- Need S
        sequenceHopping    ENUMERATED {enabled}                            OPTIONAL,  -- Need R
        ...
    }
    ...
}
```

RANDOM DMRS SEQUENCE GENERATION IN NR UPLINK

REFERENCE TO RELATED APPLICATIONS

This application is a National Phase entry application of International Patent Application No. PCT/US2019/059147 filed Oct. 31, 2019, which claims the benefit of U.S. Provisional Application No. 62/754,982 filed Nov. 2, 2018, entitled "RANDOM DMRS SEQUENCE GENERATION IN NR UPLINK", the contents of which are herein incorporated by reference in their entirety.

FIELD

The present disclosure relates to wireless technology and more specifically to demodulation reference signal (DMRS) generation in new radio (NR) uplink (UL).

BACKGROUND

Mobile communication in the next generation wireless communication system, 5G, or new radio (NR) network is going to provide ubiquitous connectivity and access to information, as well as ability to share data, around the globe. 5G networks and network slicing are expected to be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. One major enhancement for LTE in Rel-13 had been to enable the operation of cellular networks in the unlicensed spectrum, via Licensed-Assisted-Access (LAA). Ever since, exploiting the access of unlicensed spectrum has been considered by 3GPP as one of the promising solutions to cope with the ever increasing growth of wireless data traffic.

The Demodulation Reference Signal can be specific for a UE and used to estimate a radio channel. A system can beamform the DMRS, keep it within a scheduled resource, and transmit it when needed in downlink (DL) or uplink (UL). Previous approaches for supporting DMRS for Discrete Fourier Transform (DFT)-spreading-Orthogonal Frequency Division Multiplexing (DFT-s-OFDM) have been based on Zadoff-Chu (ZC) sequences, where a root sequence of a ZC sequence can be selected to minimize the cross-correlation with other ZC sequences. However, a desire to improve transmission efficiency, and the peak-to-average power ratio (PAPR) of the DMRS transmissions remains.

BRIEF DESCRIPTION OF THE DRAWINGS

FIG. 3 is an example of an information element configuration that can be employed in accordance with various aspects/embodiments described herein.

DETAILED DESCRIPTION

Figure 1:
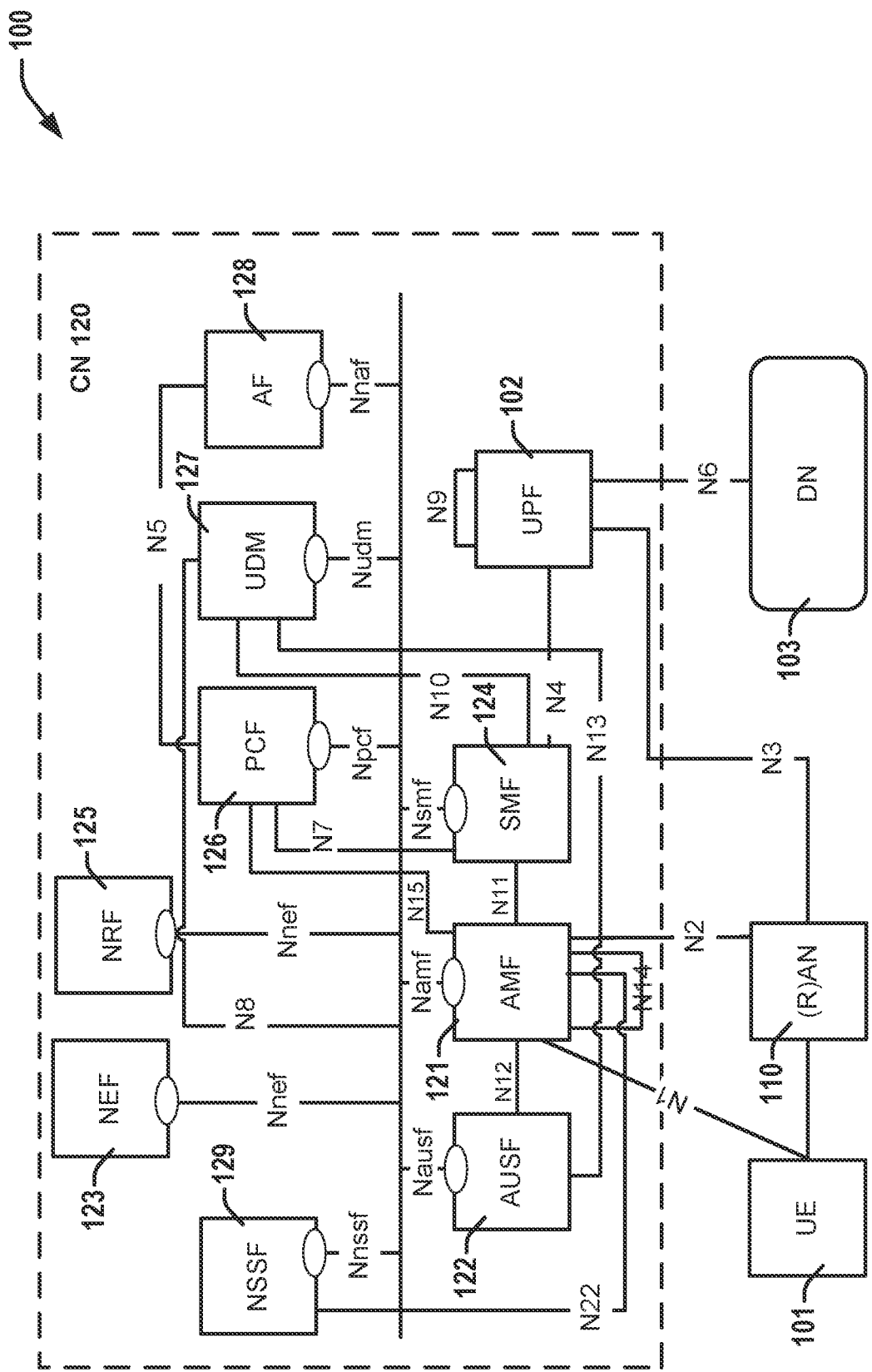
FIG. 1 is a block diagram illustrating another example system of network function components (NFs) and interfaces of an NR network architecture that can be employed in accordance with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry or device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an architecture of a system 100 including a core network (CN) 120 in accordance with various embodiments. The system 100 is shown to include a user equipment (UE) 101, which can be the same or similar to other UEs discussed herein; a radio access network (R)AN 110 or access node (AN); and a data network (DN) 103, which can be, for example, operator services, Internet access or 3rd party services; and a 5GC 120. The 5GC 120 can include an Authentication Server Function (AUSF) 112; an Access and Mobility Function (AMF) 121; a Session Management Function (SMF) 124; a Network Exposure Function (NEF) 123; a Policy Control Function (PCF) 126; a Network Function Repository Function (NRF) 125; a Unified Data Management (UDM) 127; an application function (AF) 128; a user plane function (UPF) 102; and a Network Slice Selection Function (NSSF) 129, each with respective components for processing corresponding 5GC network functions (NFs) or performance measurements related thereto as network functions associated with any one or more of the embodiments herein. Tunnelling or persistent transport connections associated with any embodiments can include a stream, connection such as a logical channel, logical connection, logical channel, or the like, which can be used for measurement task/activities/jobs associated with the NFs, or related measurements, KPIs, or service-based communications for the network.

The UPF 102 can act as an anchor point for intra-RAT and inter-RAT mobility, an external protocol data unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, uplink (UL)/downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the SEAF that it uses to derive access-network specific keys. Furthermore, AMF 121 can be a termination point of a RAN CP interface or RAN connection point interface, which can include or be an N2 reference point between the (R)AN 210 and the AMF 121; and the AMF 121 can be a termination point of Non Access Stratum (NAS) layer (N1) signalling, and perform NAS ciphering and integrity protection.

AMF 121 can also support NAS signalling with a UE 101 over an N3 Interworking Function (IWF) interface. The N3 IWF can be used to provide access to untrusted entities. N3IWF can be a termination point for the N2 interface between the (R)AN 210 and the AMF 121 for the control plane, and can be a termination point for the N3 reference point between the (R)AN 210 and the UPF 102 for the user plane. As such, the AMF 121 can handle N2 signalling from the SMF 124 and the AMF 121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G-Equipment Identity Register (EIR) (not shown by FIG. 1).

The UE 101 can register with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the Access Network (AN) (e.g., Radio Resource Control (RRC) connection or UE-N31WF connection for non-3GPP access) and the N2 connection for the UE 101 between the AN (e.g., RAN or memory 230) and the AMF 121.

The SMF 124 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit a Neff service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code, wherein a job or measurement instance includes a particular task or measurement activity to measure any particular parameter, metric, related to a KPI for any of the NFs. Additionally, the NRF 125 can exhibit the Nnrf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application FE and a Uniform Data Repository (UDR) (the FE and UDR are not shown by FIG. 2). The UDR can store subscription data and policy data for the UDM 127 and the PCF 126, and/or structured data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NSSAIs), if needed. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown by FIG. 2). Additionally, the NSSF 129 can exhibit a Nnssf service-based interface.

Additionally, there can be many more reference points and/or service-based interfaces between the NF services in the NFs; however, these interfaces and reference points have been omitted from FIG. 1 for clarity. In one example, the CN 120 can include a Nx interface, which can be an inter-CN interface between the Mobility Management Entity (MME) and the AMF 121 in order to enable interworking between CN 120 and other CN. Other example interfaces/reference points can include an N5g-Equipment Identity Register (EIR) service-based interface exhibited by a 5G-EIR, an N27 reference point between the Network Repository Function (NRF) in the visited network and the NRF in the home network; and an N31 reference point between the NSSF in the visited network and the NSSF in the home network. Further, any of the above functions, entities, etc. can be considered or include a component as referred to herein.

Figure 2:
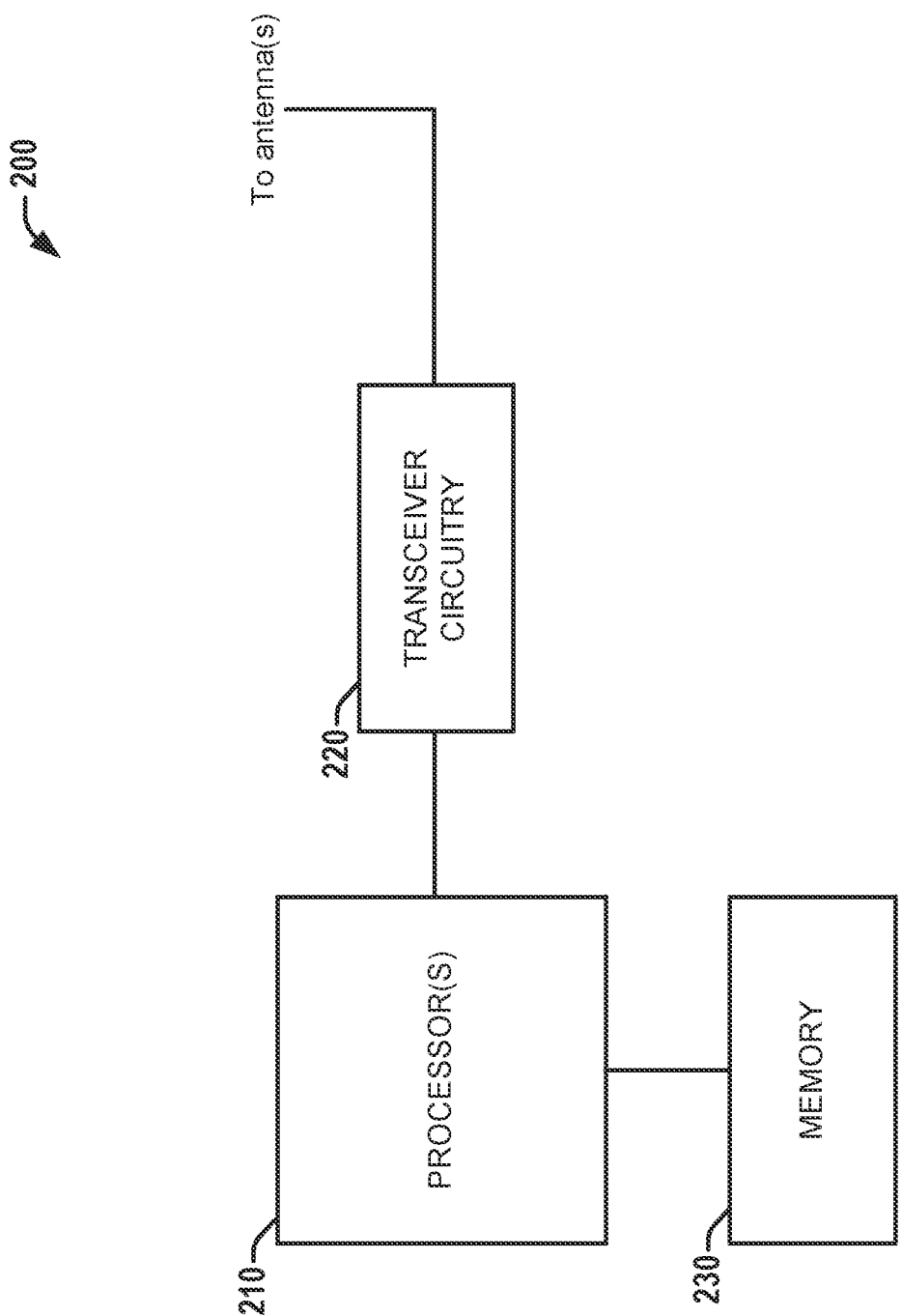
FIG. 2 is a block diagram illustrating a system employable at a UE or gNB, according to various embodiments described herein.

Referring to FIG. 2, illustrated is a block diagram of a system 200 employable at a UE (User Equipment), a next generation Node B (gNodeB or gNB) or other BS (base station)/TRP (Transmit/Receive Point), or a component of a 3GPP (Third Generation Partnership Project) network (e.g., a 5GC (Fifth Generation Core Network)) component such as a UPF (User Plane Function)) that facilitates generation and/or communication of performance measurements associated with one or more of a PDU (Protocol Data Unit) session and/or a N4 session, in embodiments. System 200 can include processor(s) 210 comprising processing circuitry and associated interface(s) (e.g., a communication interface for communicating with communication circuitry 220, a memory interface for communicating with memory 230, etc.), communication circuitry 220 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 230 (which can comprise any of a variety of storage mediums and can store instructions and/or data associated with one or more of processor(s) 210 or the communication circuitry 220 as transceiver circuitry). Specific types of embodiments (e.g., UE embodiments) can be indicated via subscripts (e.g., system 200 comprising processor(s) 210 (e.g., of a UE), communication circuitry 220, and memory 230). In BS embodiments (e.g., system 200 of a gNB) and network component (e.g., UPF (User Plane Function), etc.) embodiments (e.g., system 200 of a UPF) processor(s) 210 of the gNB (etc.), communication circuitry 220 (etc.), and memory 230 (etc.) can be in a single device or can be included in different devices, such as part of a distributed architecture.

In embodiments, signaling or messaging between different embodiments of system 200 can be generated by processor(s) 210, transmitted by communication circuitry 220 over a suitable interface or reference point (e.g., N4, etc.), received by communication circuitry 220, and processed by processor(s) 210.

In one or more embodiments, the gNB (e.g., (R)AN 110, or as a system 200) and the UE 101 or 200 can be configured to operate with multi-beam operation via the antenna. The gNB as (R)AN 110 can be configured to schedule the UE 101 for a PUSCH transmission by DCI, and further configure the DMRS used for the PUSCH.

The gNB 110 can be configured to enable transform precoding of PUSCH for DFT-s-OFDM waveform in uplink. The DMRS sequence can be generated based on a Gold sequence and modulated by $Pi \times \frac{1}{2}$ ($\pi/2$) Binary Phase-Shift Keying (BPSK). The modulated sequence can then be converted to the frequency domain by Discrete Fourier Transform (DFT) spreading.

An example of the Gold sequence can be represented as follows: $c(n)=(x_1(n+N_c)+x_2(n+N_c))$ mod 2; $x_1(n+31)=(x_1(n+3)+x_1(n))$ mod 2; $x_2(n+31)=(x_2(n+3)+x_2(n+2)+x_2(n+1)+x_2(n))$ mod 2 (Equation 1); where $N_c=1600$ and the first m-sequence $x_1(n)$ can be initialized with $x_1(0)=1$, $x(n)=0$, $n=1, 2, \ldots, 30$. The initialization of the second sequence, $x_2(n)$, is denoted by $C_{init}=\Sigma_{i=0}^{30} x_2(i) \cdot 2^i$ with the value depending on the application of the sequence.

The gNB 110 can initialize the Gold sequence by $C_{init}$ if the length of the DMRS sequence is larger than 24, for example. The value of $C_{init}$ is determined by $C_{init}=(2^{16}(N_{symb}^{slot}n_{s,f}^{\mu}+l+1)(N_{ID}+1)+N_{ID})$ mod $2^{31}$, where $N_{symb}^{slot}$ is the number of symbols per slot, l is the OFDM symbol number within the slot, $n_{s,f}^{\mu}$ is the slot number within a frame and $N_{ID}$, is configured by higher layer (e.g., a Radio Resource Control (RRC) signaling). If $N_{ID}$, is not configured by higher layer, $N_{ID}=N_{ID}^{cell}$.

Additionally, or alternatively, the value of $C_{init}$ could be derived by $C_{init}=(2^{17}(N_{symb}^{slot}n_{s,f}^{\mu}+l+1)(2N_{ID}^{nSCID}+1)+2N_{ID}^{nSCID}+n_{SCID})$ mod $2^{31}$, where $n_{SCID} \in \{0,1\}$, as a value of a scrambling identifier (SCID). Here, $N_{ID}^0, N_{ID}^1$ can be provided by higher layer parameter scramblingID0 and scramblingID1 respectively in the DMRS-UplinkConfig information element (IE). The DMRS-UplinkConfig IE in RRC layer, parameter scramblingID0 and scramblingID1 can be included in the field of transformPrecodingEnabled, for example, for DFT-s-OFDM waveform.

Alternatively, or additionally, if the length of the DMRS sequence is less than or equal to 24, where the resource allocation is less than or equal to 4 physical resource blocks (PRBs), the DMRS sequence can be initialized by $C_{init}$ according to the equation $C_{init}=(f_{gh}\ n_{ID}^{RS})$ mod 30, where $n_{ID}^{RS}=n_{ID}^{PUSCH}$ if $n_{ID}^{PUSCH}$ is configured by higher layer parameter, otherwise, $n_{ID}^{RS}=n_{ID}^{Cell}$. If group hopping (GH) is not used, then $f_{gh}=0$. If group hopping as a frequency hopping in uplink (by pattern or group pattern) is enabled, then the value of $f_{gh}$ is determined by $f_{gh}=(\Sigma_{m=0}^{7}2_m c(8(N_{symb}^{slot}n_{s,f}^{\mu}+l)+m))$ mod 30, where the sequence $c(i)$ is determined by Equation 1 and it could be initialized with $C_{init}=\lfloor n_{ID}^{RS}/30 \rfloor$. When initializing the DMRS sequence, the value of $C_{init}$ can be the same for all the lengths of various DMRS sequences.

For DFT-s-OFDM waveform in uplink, and transform precoding is enabled for PUSCH, if the DMRS sequence is generated based on Gold sequence or CGS and then modulated by $\pi/2$ BPSK, when performing the resource mapping, the reference point for subcarrier index k is subcarrier 0 of the lowest-numbered resource block of the scheduled PUSCH allocation.

FIG. 3 illustrates an example configuration of a communication 300 that can be utilized to improve the peak-to-average power ratio (PAPR) performance of DM-RS in accord with various embodiments. The communication 300 comprises a DMRS uplink configuration of an information element (IE) that is configured to indicate or enable various parameters or settings for random DMRS sequence generation in NR uplink transmissions.

For Cyclic Prefix (CP)-OFDM waveform, the uplink DMRS is based on a Gold sequence. A Gold sequence can be a Pseudo-Random sequence that can be used to generate a specific sequence or to scramble data of a specific channel, for example. One example of the Gold sequence is shown as below (as equation 1): $c(n)=(x_1(n+N_c)+x_2(n+N_c))$ mod 2; $x_1(n+31)=(x_1(n+3)+x_1(n))$ mod 2; $x_2(n+31)=(x_2(n+3)+x_2(n+2)+x_2(n+1)+x_2(n))$ mod 2; where $N_c=1600$ and a first m-sequence $x_1(n)$ can be initialized with $x_1(0)=1$, $x_1(n)=0$, $n=1, 2, \ldots, 30$. The initialization of the second sequence, $x_2(n)$, is denoted by $C_{init}=\Sigma_{i=0}^{3} x_2(i)\ 2^i$ with the value depending on an application of the sequence. Further details can be found in the NR spec 3GPP TS 38.211 v. 15.3, for example.

For an DFT-s-OFDM waveform, the uplink DMRS is based on a Zadoff-Chu (ZC) sequence, in contrast to the CP-OFDM based on the Gold sequence. However, the PAPR of Zadoff-Chu based DMRS is higher than PUSCH data modulated by $\pi/2$ BPSK. In one embodiment, PAPR performance of DMRS for an DFT-s-OFDM waveform can be increased or improved by utilizing a $\pi/2$ BPSK modulated DMRS sequence. In this approach the DMRS sequence is generated based on a Gold sequence and then modulated by $\pi/2$ BPSK. The modulated sequence is then converted to frequency domain by DFT spreading. If the DMRS sequence length is short (e.g., less than 30 elements or member objects), it could be based on computer-generated sequences (CGS).

In order to generate random Gold sequence, the pseudo-random sequence generator should be initialized by an initialization parameter $C_{init}$ and the mapping of the sequence to the physical resource could be identified, such as, for example, whether the mapping is cell common or UE specific. Various embodiment or aspects herein involve one or more processors 210 of the eNB/gNB/UE 101/110 being configured for the initialization parameter $C_{init}$ derivation for low PAPR DMRS sequence for NR uplink; as well as resource mapping for low PAPR DMRS.

In an embodiment, $C_{init}$ derivation can be processed for low PAPR with DMRS sequences of DFT-s-OFDM waveforms. For DFT-s-OFDM waveform in NR uplink, where transform precoding for PUSCH is enabled, if the DMRS sequence is generated based on Gold sequence and modulated by $\pi/2$ BPSK, then the Gold sequence can be initialized by $C_{init}$. The Gold sequence can be initialized by initialization parameter $C_{init}$ when the length of the DMRS sequence is larger than a threshold, for example. For example, this threshold can be about 24 elements. In this embodiment $C_{init}$ can be defined by Equation 2 as follows:

The gNB 110 can initialize the Gold sequence by $C_{init}$ if the length of the DMRS sequence is larger than 24, for example, and the value of $C_{init}$ is determined by $C_{init}=(2^{16}(N_{symb}^{slot}/n_{s,f}^{\mu}+l+1)(N_{ID}+1)+N_{ID})$ mod $2^{31}$, where $N_{symb}^{slot}$ is the number of symbols per slot, l is the OFDM symbol number within the slot, $n_{s,f}^{\mu}$ is the slot number within a frame and $N_{ID}$ is configured by higher layer (e.g., a Radio Resource Control (RRC) signaling). If $N_{ID}$ is not configured by higher layer, then $N_{ID}=N_{ID}^{Cell}$, the ID value is equal to the cell ID, for example.

Additionally, or alternatively, the value of $C_{init}$ could be derived by Equation 2 in the following representation: $C_{init}=(2^{17}(N_{symb}^{slot}n_{s,f}^{\mu}+l+1)(2N_{ID}^{nSCID}+1)+2N_{ID}^{nSCID} n_{SCID})$ mod $2^{31}$, where $n_{SCID} \in \{0,1\}$, as a value of a scrambling identifier (SCID) in the DMRS-UplinkConfig IE 310. Here, $N_{ID}^0, N_{ID}^1$ can be provided as indicated values by higher layer parameter scramblingID0 and scramblingID1 (e.g., Scrambling ID sub-fields 320), respectively in the DMRS-UplinkConfig IE 310. The DMRS-UplinkConfig IE 310 can be received via the RRC layer. The parameter scramblingID0 and scramblingID1 320 can be included in the field of transformPrecodingEnabled 330, for example, for a DFT-s-OFDM waveform in UL.

Alternatively, or additionally, if the length of the DMRS sequence is less than or equal to a threshold amount (e.g., 24 elements) where the resource allocation is less than or equal to four physical resource blocks (PRBs), the DMRS sequence can be initialized by $C_{init}$ according to the Equation 3 as the following representation: $C_{init}=(f_{gh}+n_{ID}^{RS})$ mod 30, where $n_{ID}^{RS}=n_{ID}^{PUSCH}$ if $n_{ID}^{PUSCH}$ is configured by higher layer parameter, otherwise, $n_{ID}^{RS}=n_{ID}^{Cell}$, and $f_{gh}$ can be a frequency group hopping value.

If group hopping (GH) is not used, then $f_{gh}=0$. If group hopping in UL is enabled, then the value of $f_{gh}$ can be determined by Equation 4 by the following representation: $f_{gh}=(\Sigma_{m=0}^{7}2^m c(8(N_{symb}^{slot}n_{s,f}^{\mu}+l)+m))$ mod 30, where the sequence c(i) can be determined by Equation 1 and can be initialized with $C_{init}=\lfloor n_{ID}^{RS}/30 \rfloor$. When initializing the DMRS sequence, the value of $C_{init}$ can be the same for all the lengths of DMRS sequences.

In another embodiment, when initializing the DMRS sequence, the value of $C_{init}$ can be the same for all the length of DMRS sequences. Because the channel estimation filters can be different for different sequences, having a common $C_{init}$ for all the length can provide for a decreased/smaller number of sequences, resulting in less channel estimation complexity.

As part of embodiments, the processor 210 can map DMRS in a mapping operation to one or more physical resources. After the DMRS sequence is generated, the processor 210 can map the physical resource element (k,l), where k is a subcarrier index relative to a reference point, and/is an OFDM symbol index. There are two options to determine the reference point for k. In option A: the reference point is subcarrier 0 in common resource block 0, where the reference point is the starting subcarrier of the entire bandwidth. With option A, the reference point is cell common. In option B: the reference point is subcarrier 0 of the lowest numbered resource block of the scheduled PUSCH resource allocation. With option B, the reference point is UE specific.

In an embodiment, for DFT-s-OFDM waveform in NR uplink, i.e. transform precoding for PUSCH is enabled, if the DMRS sequence is generated based on Gold sequence or CGS and then modulated by $\pi/2$ BPSK, when performing the resource mapping, the reference point for subcarrier index k is subcarrier 0 of the lowest-numbered resource block of the scheduled PUSCH allocation.

Figure 4:
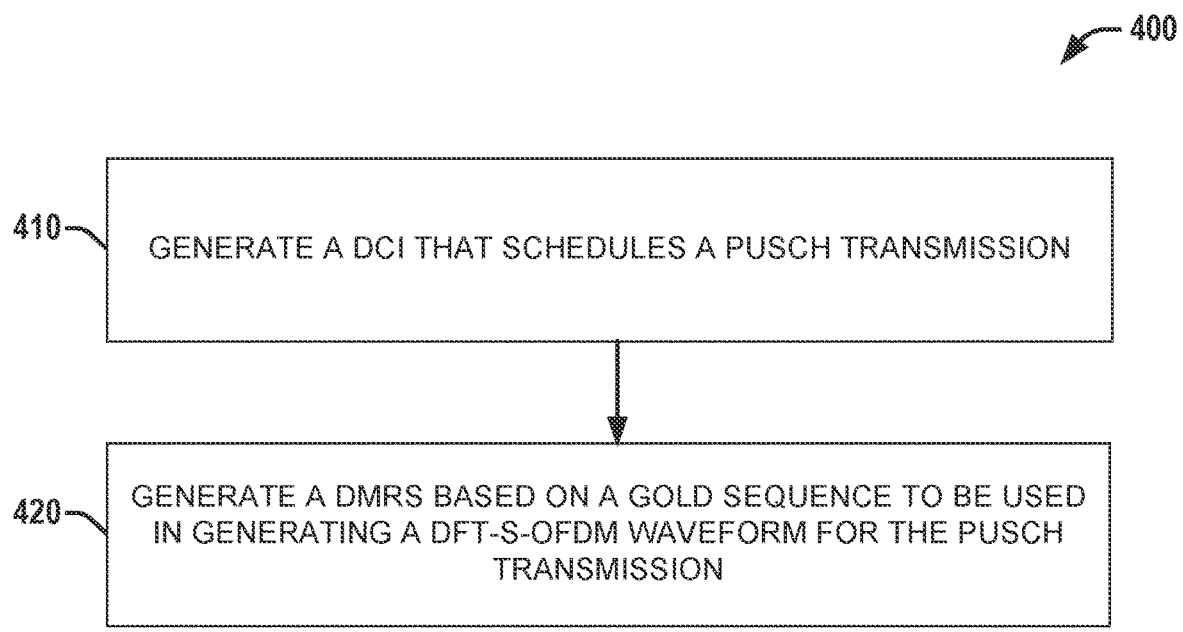
FIG. 4 is a block diagram illustrating an example process flow according to various embodiments described herein.

Referring to FIG. 4, illustrated is an example process flow 400 for a network device (e.g., a user equipment (UE), a new radio NB (gNB), or 5GC component/network device or the like) that can process, generate, or monitor new radio (NR) communication via a 5G network system (5GS) to perform operations involving a generation of random DMRS sequences in NR uplink, which can lower PAPR.

At 410, the process flow 400 comprises generating/processing a DCI that schedules a PUSCH transmission.

At 420, the process flow 400 further includes generating/configuring a DMRS based on a Gold sequence to be used in generating a DFT-s-OFDM waveform for the PUSCH transmission.

The process flow 400 can further include modulating the DMRS of the DFT-s-OFDM waveform based on the Gold sequence using a Pi/2 BPSK sequence. Further, the process flow 400 can include initializing the Gold sequence based on an initialization parameters $C_{init}=(2^{17} (N_{symb}^{slot}n_{s,f}^{\mu}+l+1) (2N_{ID}^{nSCID}+1)+2N_{ID}^{nSCID} n_{SCID})$ mod $2^{31}$) where $n_{SCID} \in \{0,1\}$, as a value of a scrambling identifier (SCID), wherein $N_{ID}^0, N_{ID}^1$ can be provided by higher layer parameter scramblingID0 and scramblingID1 respectively in an DMRS-UplinkConfig information element (IE). This can include receiving or process the DMRS-UplinkConfig IE in an RRC layer, and a parameter scramblingID0 and scramblingID1 in a field of transformPrecodingEnabled of the DMRS-UplinkConfig IE for the DFT-s-OFDM waveform.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a gNode B (gNB) for a new radio (NR) network comprising: a memory interface; and processing circuitry configured to: schedule one or more physical uplink shared channel (PUSCH) transmissions via Downlink Control Information (DCI); and configure a Demodulation Reference Signal (DMRS) to be used in generating the one or more PUSCH transmissions.

A second example can include the first example, wherein the processing circuitry is further configured to: enable transform precoding for the one or more PUSCH transmissions associated with a Discrete Fourier Transform (DFT) spread Orthogonal Frequency Division Multiplexing (DFTs-OFDM) waveform in uplink, wherein a sequence of the DMRS is based on a Gold sequence.

A third example can include the first or second example, wherein the processing circuitry configured to modulate the sequence of the DMRS based on a Pi/2 Binary Phase-Shift Keying (BPSK) to generate a modulated Pi/2 BPSK sequence of the DMRS, and convert the modulated Pi/2 BPSK sequence to a frequency domain by a Discrete Fourier Transform (DFT) spreading.

A fourth example can include any one of the first through third examples, wherein the processing circuitry is configured to initialize the Gold sequence with an initialization parameter in response to a length of the sequence of the DMRS being larger than twenty-four (24).

A fifth example can include any one of the first through fourth examples, wherein the processing circuitry is further configured to generate a sequence of the DMRS with a Gold sequence based on an initialization parameter, and generate the initialization parameter according to a number of symbols per slot, a number of OFDM symbols within a slot, a slot number within a frame and an ID value.

A sixth example can include any one of the first through fifth examples, wherein the processing circuitry is further configured to determine a value of a scrambling ID based on a DMRS UplinkConfig information element comprising at least one of: ScramblingID0 or ScramblingID1, and generate the initialization parameter based on the scrambling ID.

A seventh example can include any one of the first through sixth examples, wherein the processing circuitry is further configured to initialize a DMRS sequence of the DMRS with an initialization parameter as a function of a frequency group hopping parameter, and a PUSCH ID or a cell ID, if a length of the DMRS sequence is less than or equal to twenty-four (24) and a resource allocation is less than or equal to four physical resource blocks (PRBs).

An eighth example can include any one of the first through seventh examples, wherein the processing circuitry is further configured to provide an indication that indicates whether frequency group hopping is enabled to be used, and in response to the frequency group hopping being used, initialize a DMRS sequence of the DMRS with an initialization parameter as a function of a frequency group hopping parameter that is based on a number of symbols per slot and a Gold sequence.

A ninth example can include any one of the first through eighth examples, wherein a value of the initialization parameter comprises a same length for a plurality of different lengths of DMRS sequences.

A tenth example can include any one of the first through ninth examples, wherein the processing circuitry is further configured to perform resource mapping with a reference point for a subcarrier index being a subcarrier zero of a lowest-numbered resource block of a scheduled PUSCH allocation, in response to the DMRS being based on a Gold sequence or a computer generated sequence (CGS), and modulated based on a Pi/2 BPSK sequence.

An eleventh example can be an apparatus configured to be employed in a User Equipment (UE) for a new radio (NR) network comprising: a memory interface; and processing circuitry configured to: process a Downlink Control Information (DCI) that schedules a Physical Uplink Shared Channel (PUSCH) transmission in a PUSCH; and generate the PUSCH transmission based on a Demodulation Reference Signal (DMRS) with a multi-beam operation.

A twelfth example can include the eleventh example, wherein the processing circuitry is further configured to: generate a Discrete Fourier Transform (DFT) spread Orthogonal Frequency Division Multiplexing (DFT-s-OFDM) waveform in uplink for the PUSCH, wherein a sequence of the DMRS is based on a Gold sequence and a Pi/2 Binary Phase-Shift Keying (BPSK) modulation.

A thirteenth example can include any one of the eleventh through the twelfth examples, wherein the processing circuitry is further configured to: generate a sequence of the DMRS based on a computer-generated sequence (CGS) in response to a length of the sequence being less than thirty (30), and based on a Gold sequence and a Pi/2 Binary Phase-Shift Keying (BPSK) modulation, response to being greater or equal to 30.

A fourteenth example can include any one of the eleventh through the thirteenth examples, wherein the processing circuitry is further configured to: initialize the Gold sequence with an initialization parameter in response to a length of the sequence of the DMRS being larger than twenty-four.

A fifteenth example can include any one of the eleventh through the fourteenth examples, wherein the processing circuitry is further configured to: in response to a length of a DMRS sequence of the DMRS being less than or equal to twenty-four (24), and a resource allocation is less than or equal to four physical resource blocks (PRBs), initialize the DMRS sequence based on an initialization parameters $C_{init}$ according to an equation $C_{init}=(f_{gh}+n_{ID}^{RS})$ mod 30, where $n_{ID}^{RS}=n_{ID}^{PUSCH}$ if $n_{ID}^{PUSCH}$ is configured by higher layer parameter, otherwise, $n_{ID}^{RS}=n_{ID}^{Cell}$, wherein $f_{gh}$ is a frequency group hopping parameter, $n_{ID}^{RS}$ is a reference signal ID, $n_{ID}^{PUSCH}$ is a PUSCH ID, and $n_{ID}^{Cell}$ a cell ID.

A sixteenth example can include any one of the eleventh through the fifteenth examples, wherein the processing circuitry is further configured to: in response to the DMRS being based on a Gold sequence or a computer generated sequence (CGS), and modulated based on a Pi/2 BPSK sequence: process a resource mapping with a reference point for a subcarrier index being a subcarrier zero in a common resource block zero, wherein the reference point is a starting subcarrier of an entire bandwidth, and the reference point comprises a cell common reference point; or process the resource mapping with the reference point for the subcarrier index being the subcarrier zero in a lowest-numbered resource block of a scheduled PUSCH allocation, wherein the reference point comprises a UE specific reference point.

A seventeenth example can be a computer readable storage device storing executable instructions that, in response to execution, cause one or more processors of a gNode B (gNB) on a new radio (NR) network to perform operations, the operations comprising: generating a Downlink Control Information (DCI) that schedules a physical uplink shared channel (PUSCH) transmission; and generating a Demodulation Reference Signal (DMRS) based on a Gold sequence to be used in generating a Discrete Fourier Transform (DFT) spread Orthogonal Frequency Division Multiplexing (DFT-s-OFDM) waveform for the PUSCH transmission.

An eighteenth example can include the seventeenth example, wherein the operations further comprise: modulating the DMRS based on the Gold sequence using a Pi/2 BPSK sequence.

A nineteenth example includes any one of the seventeenth through eighteenth examples, wherein the operations further comprise: initializing the Gold sequence based on an initialization parameters $C_{init}=(2^{17}(N_{symb}^{slot}n_{s,f}^{\mu}+l+1)(2N_{ID}^{nSCID}+1)+2N_{ID}^{nSCID}n_{SCID})$ mod $2^{31}$) where $n_{SCID} \in \{0, 1\}$, as a value of a scrambling identifier (SCID), wherein $n_{ID}^{0}, N_{ID}^{1}$ can be provided by higher layer parameter scramblingID0 and scramblingID1 respectively in an DMRS-UplinkConfig information element (IE).

A twentieth example includes any one of the seventeenth through nineteenth examples, wherein the operations further comprise: receiving the DMRS-UplinkConfig IE in an RRC layer, and a parameter scramblingID0 and scramblingID1 in a field of transformPrecodingEnabled of the DMRS-UplinkConfig IE for the DFT-s-OFDM waveform.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A processor, comprising:
  a memory interface; and
  processing circuitry coupled with the memory interface, the processing circuitry configured to:
    configure a Demodulation Reference Signal (DMRS) sequence for a physical uplink shared channel (PUSCH) transmission with transform precoding enabled, wherein the DMRS sequence is modulated by PI/2 binary phase shift keying (BPSK);
    schedule, via Downlink Control Information (DCI), the PUSCH transmissions; and
    process the PUSCH transmission with the DMRS sequence, wherein, in response to a length of the DMRS sequence is equal or greater than 30, the DMRS sequence is based on a Gold sequence and based on an ID value for scrambling initialization provided by a higher layer parameter.

2. The processor of claim 1, wherein the PUSCH transmission is associated with a Discrete Fourier Transform (DFT) spread Orthogonal Frequency Division Multiplexing (DFT-s-OFDM) waveform in uplink.

3. The processor of claim 1, wherein, in response to the length of the DMRS sequence is less than 30, the DMRS sequence is based on computer generated sequences.

4. The processor of claim 3, wherein, if the length of the DMRS sequence is less than 30, the DMRS sequence is modulated by PI/2 BPSK.

5. The processor of claim 1, wherein an initialization parameter for scrambling initialization is generated according to a number of symbols per slot, an OFDM symbol number, a slot number within a frame, and the ID value.

6. The processor of claim 1, wherein the higher layer parameter is included in a DMRS UplinkConfig information element.

7. The processor of claim 1, wherein the processing circuitry is further configured to initialize the DMRS sequence with an initialization parameter as a function of a frequency group hopping parameter, and a PUSCH ID or a cell ID, if a length of the DMRS sequence is less than or equal to twenty-four (24) and a resource allocation is less than or equal to four physical resource blocks (PRBs).

8. The processor of claim 1, wherein the processing circuitry is further configured to provide an indication that indicates whether frequency group hopping is enabled to be used, and in response to the frequency group hopping being used, initialize the DMRS sequence with an initialization parameter as a function of a frequency group hopping parameter that is based on number of symbols per slot and the Gold sequence.

9. The processor of claim 8, wherein a value of the initialization parameter comprises a same length for a plurality of different lengths of DMRS sequences.

10. The processor of claim 1, wherein the processing circuitry is further configured to perform resource mapping with a reference point for a subcarrier index being a subcarrier zero of a lowest-numbered resource block of a scheduled PUSCH allocation.

11. A baseband processor, comprising:
  a memory interface; and
  processing circuitry configured to:
    receive a higher layer parameter for scrambling initialization for a Demodulation Reference Signal (DMRS) sequence generation modulated by PI/2 binary phase shift keying (BPSK) for Physical Uplink Shared Channel (PUSCH) transmissions with transform precoding enabled;
    receive a Downlink Control Information (DCI) that schedules a PUSCH transmission; and
    generate a DMRS sequence for the PUSCH transmission, wherein:
      in response to a length of the DMRS sequence is less than 30, generate the DMRS sequence based on sequences modulated by PI/2 BPSK; or
      in response to the length of the DMRS sequence is not less than 30, generate the DMRS sequence with a Gold sequence based on the higher layer parameter as an ID value for scrambling initialization; and
    map the DMRS sequence for the PUSCH transmission to physical resource elements for transmission, wherein a reference point for the mapping is subcarrier 0 of the lowest numbered resource block allocated for the PUSCH transmission.

12. The baseband processor of claim 11, wherein the processing circuitry is further configured to:
   generate a Discrete Fourier Transform (DFT) spread Orthogonal Frequency Division Multiplexing (DFT-s-OFDM) waveform in uplink for the PUSCH transmission.

13. The baseband processor of claim 11, if the length of the DMRS sequence is less than 30, the DMRS sequence is initialized based on an initialization parameter $C_{init}$ according to an equation $C_{init}=(f_{gh}+n_{ID}^{RS})$ mod 30, where $n_{ID}^{RS}=n_{ID}^{PUSCH}$ PUSCH if $n_{ID}^{PUSCH}$ is configured by a higher layer parameter, otherwise, $n_{ID}^{RS}=n_{ID}^{Cell}$, wherein $f_{gh}$ is a frequency group hopping parameter, $n_{ID}^{RS}$ is a reference signal ID, $n_{ID}^{PUSCH}$ is a PUSCH ID, and $n_{ID}^{Cell}$ is a cell ID.

14. The baseband processor of claim 11, wherein the processing circuitry is further configured to:
   initialize the Gold sequence with an initialization parameter in response to a length of the DMRS sequence being larger than twenty-four.

15. The baseband processor of claim 11, wherein the reference point comprises a UE specific reference point.

16. A method for a base station to perform operations, the operations comprising:
   generating a Downlink Control Information (DCI) that schedules a physical uplink shared channel (PUSCH) transmission;
   generating a Demodulation Reference Signal (DMRS) based on a Gold sequence to be used in generating a Discrete Fourier Transform (DFT) spread Orthogonal Frequency Division Multiplexing (DFT-s-OFDM) waveform for the PUSCH transmission; and
   initializing the Gold sequence based on an initialization parameter $C_{init}=(2^{17}(N_{symb}^{slot} n_{s,f}^{u}+l+1)(2N_{ID}^{nSCID}+n_{SCID}) \mod_2^{31}$, where $N_{SCID} \in \{0,1\}$, as a value of a scrambling identifier (SCID), wherein $N_{ID}^{0}$, $N_{ID}^{1}$ can be provided by higher layer parameters scramblingID0 and scramblingID1 respectively in a DMRS-UplinkConfig information element (IE).

17. The method of claim 16, wherein the operations further comprise:
   modulating the DMRS based on the Gold sequence using a Pi/2 BPSK sequence.

18. The method of claim 16, wherein the operations further comprise:
   receiving the DMRS-UplinkConfig IE in an RRC layer, and the higher layer parameters scramblingID0 and scramblingID1 are in a field of transformPrecodingEnabled of the DMRS-UplinkConfig IE for the DFT-s-OFDM waveform.

* * * * *